United States Patent [19]
Lasiter

[11] Patent Number: 5,117,576
[45] Date of Patent: Jun. 2, 1992

[54] ADJUSTABLE DEPTH FISHING FLOAT

[76] Inventor: Glennis W. Lasiter, HCR 2, Box 2023-2, Shell Knob, Mo. 65747

[21] Appl. No.: 640,843

[22] Filed: Jan. 14, 1991

[51] Int. Cl.$^5$ ............................................. A01K 83/06
[52] U.S. Cl. .................................... 43/44.9; 43/44.91
[58] Field of Search ................ 43/44.9, 44.91, 44.92, 43/44.95, 44.87, 44.88

[56] References Cited

U.S. PATENT DOCUMENTS

| | | | |
|---|---|---|---|
| 2,208,240 | 7/1940 | Arneszn et al. | 43/44.91 |
| 2,221,437 | 11/1940 | Allison | 43/44.91 |
| 3,341,965 | 9/1967 | Purcella | 43/44.91 |
| 3,353,294 | 11/1961 | Murdorff et al. | 43/44.91 |
| 3,667,149 | 10/1969 | Daigle | 43/43.15 |
| 3,672,087 | 6/1972 | Milburn, Jr. | 43/44.91 |
| 4,047,319 | 9/1977 | Duncan | 43/44.91 |
| 4,455,056 | 7/1968 | Cultrera | 43/44.91 |

Primary Examiner—Richard K. Seidel
Assistant Examiner—Chuck Y. Mah
Attorney, Agent, or Firm—Richard P. Stitt

[57] ABSTRACT

A fishing float or a bobber is designed which permits remote adjustment of fishing line depth beneath the bobber without removal of the bobber or float from the water. By use of the fishing rod to manipulate a ball and ball seat attached to the bobber, the angler can release the fishing line from suspension at a particular depth beneath the bobber and raise or lower the hook attached to the fishing line. Subsequent manipulation of the device by angler movement of the fishing line will again seat the ball to restrain the line movement and resuspend the hook at a second depth beneath the bobber.

23 Claims, 1 Drawing Sheet

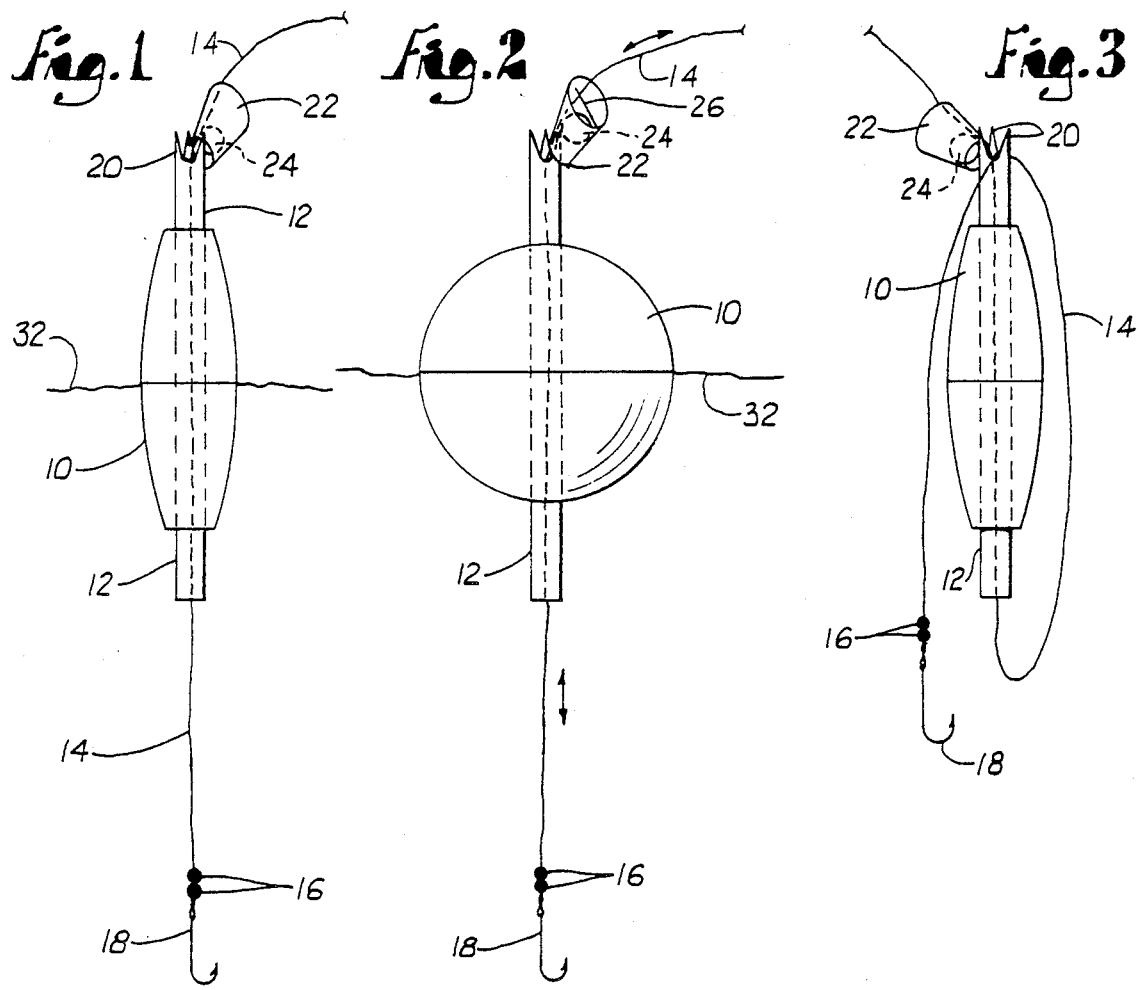
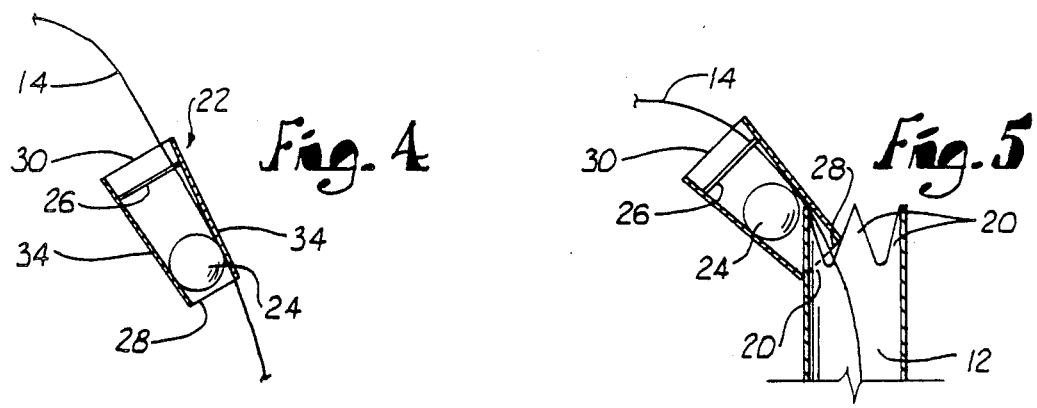

ADJUSTABLE DEPTH FISHING FLOAT

BACKGROUND OF THE INVENTION

The present invention relates to fishing bobbers, in particular, a fishing bobber which permits adjustment of fishing line depth beneath the bobber without removal of the fishing line and bobber from the water.

When fishing it occasionally becomes necessary to suspend live bait or fishing tackle above heavy weed beds or other obstacles. Also, it may be desirable to suspend fishing tackle at a particular depth in water where fish are most likely to reside. In the latter case, particular fish frequently maintain a specific depth within water depending upon water conditions or feeding preferences.

As fish are cold blooded creatures their body temperatures are governed by the temperature of the surrounding environment. Each species will exhibit a preference towards a specific temperature range. A body of water will stratify into three distinct layers based upon water temperature. The bottom layer, the coldest, is known as the hypolimnion. The top, warmest region, is denominated as the epilimnion, and between these two bottom and top regions is a transition zone called the thermocline. The water temperature in the thermocline changes 1½ a degree for every foot of depth.

In the summer months the bottom layer or hypolimnion contains little or no oxygen due to use of oxygen from the hypolimnion in the decomposition of dead plants, and other organic matter. Therefore, fish will be found in the upper two layers of the water with different species favoring particular depths presenting temperature most suitable to their species. As a result, the importance of fishing at the proper depth to present the bait to the desired species, or any fish at all, can be a critical factor to anglers.

One popular game fish, the crappie, is well known for its propensity to select and maintain a particular depth in water depending upon water temperature and degree of oxygenation. For example, just before spawning crappies will frequently hold in 6 to 12 feet of water near spawning areas. During the heat of summer the crappie will move to lower depths for cooler water temperatures. When presented with an incoming cold front the crappie will frequently move away from the shore of the lake and into water 8 to 10 feet deep.

Another popular game fish, the black bass, possesses an air bladder or swim bladder which it can inflate or deflate to help maintain neutral buoyancy and suspend itself at any depth within a body of water. Therefore, a black bass or other fish with a swim bladder can hold at any particular level within a lake and simply wait for its prey to approach. In such cases the necessity of fishing at a particular depth is critical to attracting a strike from such a comparatively sedentary fish.

Because of this tendency of fish to select a specific depth range it is necessary for the angler to first determine the depth at which the fish are located and then to present the bait or tackle at that depth. Generally the bait or tackle is suspended at a particular depth by permitting enough line to hang below a float or bobber to reach the desired depth in the water. During the course of fishing it may be necessary to change the depth of the tackle as it is suspended beneath a fishing float or bobber. Normally this necessitates reeling in the tackle, manually readjusting the length of line beneath the bobber and then recasting. Alternatively, an angler may approach the fishing float and lean over the side of the boat to make such an adjustment. In either case, the fishing tackle and the surrounding water are disturbed by the actions of the angler in manually changing the fishing depth beneath the bobber.

Thus there is a substantial need for a fishing float or bobber which will permit the angler to make depth adjustments in tackle which can be conducted at some distance from the float or bobber and without creating a disturbance of the water being fished in.

Therefore, it is an object of the present invention to provide a fishing bobber or float which permits fishing at a specific depth beneath the bobber.

Another important objective of the present invention is to provide a bobber which permits fishing line depth adjustment.

A further objective is to provide a fishing bobber which permits line depth adjustment while maintaining the fishing bobber and attached line in the water.

Yet another objective of the present invention is to provide fishing line depth adjustment without removal of the fishing tackle or bobber from water.

Yet another important objective is to provide a bobber which permits adjustment of the fishing depth to be conducted at a distance from the bobber without approaching the bobber or disturbing the surrounding water.

A further objective is to provide a fishing bobber which allows the fishing depth to be set and then the bobber and tackle cast into the water as a unit which will then maintain the specific preset fishing depth.

Other objects and advantages of this invention will become apparent from the following description taken in connection with the accompanying drawings, wherein is set forth by way of illustration and example, an embodiment of this invention.

DESCRIPTION OF THE DRAWINGS

FIG. 1 is a side elevational view of the invention resting on a water surface illustrating the arrangement of the device to restrain line movement;

FIG. 2 is a side elevational view of the invention resting on a water surface and showing the device positioned to release fishing line movement in the directions indicated by the arrows;

FIG. 3 is a side elevational view of the device arranged to restrain line movement and illustrating the positioning of the fixed fishing line on the device to assist casting;

FIG. 4 is an enlarged cross-sectional view of the seat showing the fishing line passing therethrough being fixed to restrain movement; and FIG. 5 is an enlarged cross-sectional view of the seat situated on a prong of the device thereby releasing the line for depth adjustment.

DESCRIPTION OF THE PREFERRED EMBODIMENT

Referring now to FIG. 1 the present invention is shown resting on a water surface 32 being supported thereon by a float or bobber 10. Passing through bobber 10 is hollow tube 12 which is of sufficient diameter to allow line 14 to move freely through the center of tube 12. As indicated in FIG. 1 and FIG. 2 by bobber 10 (FIG. 1) and bobber 10 (FIG. 2), the bobber shape may be of any type which is convenient.

Referring again to FIG. 1 the top of tube 12 is provided with prongs 20. The three prongs 20 are equally spaced about the circumference of tube 12 and have smooth edges so they do not cut into or cause fraying of line 14. Attached to line 14 prior to line 14 entry into tube 12 is cone or ball seat 22 which serves to halt the movement of line 14 through tube 12.

Referring now to FIG. 4 and FIG. 5 the construction and operation of seat 22 will be discussed in detail. In the preferred embodiment ball seat 22 is a hollow cone having an open truncated apex 28. This configuration permits line 14 to be inserted through seat 22 easily and without inhibition of movement of line 14. Cone or seat 22 may be made of any lightweight material. The material selected, preferably a plastic, should offer rigidity of wall 34 and should not be so heavy as to interfere with the action of bobber 10 or to unnecessarily weight line 14. Contained within seat 22 is sphere 24. Sphere 24 is of any diameter which will conveniently fit within seat 22 and be trapped therein without exiting opening 28. It should be noted that the references to ball seat or cone base 30 and ball seat or cone top 28 are utilized in the geometric sense wherein the frustum of a cone having the larger diameter is denominated as the base and the frustum having the smaller diameter is denominated as the top or apex. In the present invention the cone 22 is generally utilized in an inverted or sidewise position and as such the reference to cone base 30 and cone top or apex 28 is not intended to indicate directional orientation of the cone.

Sphere 24 is held within seat 22 by retaining pin 26 which prevents sphere 24 from exiting seat 22 from base 30. Once sphere 24 is inserted into seat 22 retaining pin 26 is inserted to prevent the exiting of sphere 24. Retaining pin 26 may be held in place by frictionally engaging walls 34 of seat 22 or, alternatively, may be passed through opposing holes in wall 34.

As may be observed in FIG. 1 in conjunction with FIG. 4 when base 30 of cone 22 is in an upright or nearly upright position sphere 24 is directed towards cone top or apex 28. This positioning of sphere 24 causes line 14 to be captured between sphere 24 and wall 34 of cone 22. This capture of line 14 between sphere 24 and wall 34 results when seat 22 abuts against tube 12 preventing seat 22 from sliding along line 14. Sphere 24 is thus pushed into a light frictional fit with seat 22 and causes frictional capture of line 14 between sphere 24 and wall 34 thus preventing continued travel of line 14 through the seat and subsequently through tube 12. It is this action between sphere 24 and wall 34 of cone 22 which is utilized as a means to halt the travel of line 14 at a particular length below water surface 32 as selected by the operator.

Referring now to FIG. 5, the means by which release of line 14 from capture between sphere 24 and wall 34 of seat 22 is illustrated. Prongs 20 extend from the top of tube 12 and serve as the release mechanism which enables continued readjustment of the length of line 14 suspended below bobber 10 and, therefore, the depth below bobber 10 at which fishing is accomplished. When cone or seat apex 28 is engaged upon one of prongs 20 the prong enters into the interior of cone 22 and pushes sphere 24 upward into a larger diameter area of cone 22. In this manner the frictional capture of line 14 between sphere 24 and wall 34 is eliminated and line 14 is then freely moveable and may slip through seat 22 and tube 12 in either direction.

When line 14 is freed in this manner an angler may allow additional length of line 14 to pass through seat 22 and tube 12 to provide additional length of line 14 suspended below tube 12 and thereby increasing the depth below bobber 10 at which fishing accomplished. In the reverse fashion, if it is desired to fish at a depth nearer to bobber 10, line 14 is pulled out of tube 12 and through seat 22 thereby decreasing the depth at which hook 18 (FIG. 1) is suspended below float or bobber 10 on water surface 32. Thus, the depth at which hook 18 is suspended below bobber 10 may be raised or lowered by the lengthening or shortening of the amount of line 14 which is permitted to extend beyond seat 22.

Once the angler has lengthened or shortened the amount of line 14 extending beyond seat 22, while seat 22 is in position upon prong 20, the retaining action of seat 22 on sphere 24 may be activated. This is done by disengaging cone 22 from prong 20 (FIG. 5) and positioning seat 22 off to the side of the top of tube 12 as illustrated in FIG. 3.

As can be seen in FIG. 3 seat 22 is no longer atop prong 20 and thus sphere 24 is free to roll towards seat ape 28 and again compress line 14 against wall 34 of seat 22. This transfer of seat 22 off of prong 20 and onto the side of tube 12 is accomplished by the angler moving the user end of fishing line 14, which may be attached to a fishing rod (not shown), in a rapid sideways motion with respect to the vertical axis of tube 12. Such rapid sideways action, when correctly applied, removes seat 22 from atop prong 20 and allows seat 22 to rest at the side of tube 12. In this position base 30 of seat 22 is held at a slightly upward angle by the segment of line 14 extending between base 30 of cone 22 and the fishing rod (not shown). The base 30 is retained in this slightly upward angle by the weight of the hook 18 and sinker 16 pulling downwardly on line 14. At this angle sphere 24 within seat 22 moves toward apex 28 thus again capturing line 14 between sphere 24 and wall 34. Also in this position the capture of line 14 between sphere 24 and wall 34 is enhanced by the downward pressure on line 14 caused by sinker 16 (FIG. 1) and the weight of the fishing tackle or hook 18 which tends to pull sphere 24 into more secure contact against wall 34.

Referring now to FIG. 3 the present invention is shown withdrawn from the water and formed in a position just prior to casting of the bobber 10 and tackle 18 into the water. As shown in FIG. 3 an amount of line 14 has been draped over prongs 20 to produce a more compact bundle for casting. In this manner a specific segment of line 14 may be preset to hang below cone 22 and fixed at that position by the placement of cone 22 off to the side of tube 12, thus engaging the restraining action of seat 22. The angler may then cast the bobber into the water. At the moment of contact with the water the hook 18 and line 14 suspended below seat 22 is knocked free from prongs 20 and may fall into the water thus achieving the preselected fishing depth. While seat 22 may also be jostled or become separated from its contact tube 12 it nevertheless maintains its position on line 14 due to the frictional engagement of line 14 between sphere 24 and wall 34 (FIG. 4) and upon sinking of hook 18 to the selected depth cone 22 reengages against the side of tube 12 thus achieving the fishing depth which was preselected prior to casting.

While the bobber is then resting on the water if the angler decides to readjust the depth of the hook in the water the rapid side action movement of the fishing rod previously described may be utilized to mount seat 22 upon prong 20 thus freeing line 14 from its capture between wall 34 and sphere 24 (FIG. 4). The angler may then increase or decrease the depth at which hook 18 is suspended below bobber 12 and by a subsequent sideways motion reestablish the line holding action of seat 22 and continue fishing at the newly selected depth.

In this manner an angler may fish at the same location at a variety of depths without disturbing the water by multiple casts and without having to move into proximity with the bobber to manually readjust the depth of hook 18 below bobber 10.

It is to be understood that while certain forms of this invention have been illustrated and described, it is not limited thereto, except in so far as such limitations are included in the following claims and allowable functional equivalents therefor.

Having thus described the invention, what is claimed is new and desired to be secured by Letters Patent is:

1. For use with a fishing line having a first user end and a second fishing hook end, a fishing bobber device comprising:
   a float on a body of water;
   a tube, having an upper end and a lower end, said tube extending through said float to submerge said lower end in the water for movement of the fishing line therethrough such that the hook end extends below said lower tube end; and
   brake means on the fishing line, remotely operable by manipulation of the fishing line user end, for regulating a back and forth movement of the fishing line through said brake means and said tube upon contact of said brake means with said tube, whereby to vary and then maintain the distance between said hook end and said float while said float remains in the water.

2. The device as claimed in claim 1 wherein said brake means comprises:
   means for restraining movement of said line through said tube; and
   means for releasing said restraining means.

3. The device as claimed in claim 2 wherein said means for releasing comprises at least one projection on said tube upper end engageable with said restraining means to release said line from said restraining means.

4. The device as claimed in claim 2 wherein said means for restraining comprises:
   a ball seat with said line passing therethrough and said seat moveably positioned on said line between said user end and said tube;
   a sphere within said seat such that movement of said line through said seat toward said tube draws said sphere towards registration with said line therebetween; and
   a portion of said tube at said upper end for contact with said seat to urge registration of said ball in said seat and capture of said line therebetween whereby to restrain said movement of said line toward said tube.

5. The device as claimed in claim 4 wherein said ball seat comprises a hollow cone having an apex oriented on said line toward said tube.

6. The device as claimed in claim 4 wherein said means for releasing comprises at least one projection on said tube upper end engageable with said sphere upon manipulation of said user end of said line, said engagement urging said sphere out of said registration with said seat to allow movement of said line through said seat and said tube.

7. For use with a fishing line having a first user end and a second fishing hook end, a fishing bobber device comprising:
   a float;
   a tube, having an upper end and a lower end, said tube extending through said float for movement of said fishing line therethrough such that said hook end depends from said lower tube end;
   a ball seat being slidably moveable along said line between said user end and said tube;
   a sphere registered in said seat upon contact of said seat with a side of said tube, said registered sphere capturing said line between said seat and said sphere and
   at least one projection on said tube upper end engageable with said sphere to release said sphere from said seat and said line from said capture.

8. The device as claimed in claim 7 wherein said seat is positioned upon said at least one projection by user manipulation of said user line end.

9. The device as claimed in claim 7 wherein said ball seat comprises a hollow cone having an apex oriented on said line toward said tube.

10. For use with a fishing line having a first user end and a second fishing hook end, a fishing bobber device comprising:
    a float;
    a tube, having an upper end and a lower end, said lube extending through said float for movement of said fishing line therethrough with said hook end depending from said lower tube end;
    a hollow cone with said line passing therethrough, said cone being slidably movable on said line between said user end and said tube and said con having an apex oriented on said line toward said tube;
    a sphere contained in said cone to capture said line between said cone and said sphere when said cone slides on said line into contact with a side of said tube; and
    at least one projection on said tube upper end engageable with said sphere to release said sphere from said cone and said line from said capture.

11. The device as claimed in claim 10 further comprising means for retaining said sphere in said cone.

12. The device as claimed in claim 11, wherein the retaining means is a pin spanning a base of said cone thereby holding said sphere within said cone.

13. For use with a fishing line having a first user end and a second fishing hook end, a fishing bobber device comprising:
    a float;
    a tube, having an upper end and a lower end, said tube extending through said float for movement of said fishing line therethrough such that said hook end depends from said lower tube end;
    means for adjusting the distance between said hook end and said float comprising:
      means for restraining movement of said line through said tube; and
      at least one projection on said tube upper end engageable with said restraining means to release said restraining means.

14. The device as claimed in claim 13 wherein said means for restraining comprises:
    a ball seat with said line passing therethrough and said seat movably positioned on said line between said user end and said tube;

a sphere within said seat such that movement of said line through said seat toward said tube draws said sphere towards registration with said line therebetween; and a portion of said tube at said upper end for contact with said seat to urge registration of said ball in said seat and capture of said line therebetween whereby to restrain said movement of said line toward said tube.

15. The device as claimed in claim 14 wherein said ball seat comprises a hollow cone having an apex oriented on said line toward said tube.

16. The device as claimed in claim 14 wherein said at least one projection engages with said sphere upon manipulation of said user end of said line, said engagement urging said sphere out of said registration with said seat to allow movement of said line through said seat and said tube.

17. The device as claimed in claim 13 wherein said means for adjusting is operable by a remote user.

18. The device as claimed in claim 13 wherein said means for adjusting is operable by remote user manipulation of the fishing line user end.

19. For use with a fishing line having a first user end and a second fishing hook end, a fishing bobber device comprising:

a float;

a tube, having an upper end and a lower end, said tube extending through said float for movement of said fishing line therethrough such that said hook end depends from said lower tube end;

means for adjusting the distance between said hook end and said float comprising:

means for restraining movement of said line through said tube including:

a ball seat with said line passing therethrough and said seat movably positioned on said line between said user end and said tube;

a sphere within said seat such that movement of said line through said seat toward said tube draws said sphere towards registration with said line therebetween;

a portion of said tube at said upper end for contact with said seat to urge registration of said ball in said seat and capture of said line therebetween whereby to restrain said movement of said line toward said tube; and means for releasing said restraining means.

20. The device as claimed in claim 19 wherein said ball seat comprises a hollow cone having an apex oriented on said line toward said tube.

21. The device as claimed in claim 19 wherein said at least one projection engages with said sphere upon manipulation of said user end of said line, said engagement urging said sphere out of said registration with said seat to allow movement of said line through said seat and said tube.

22. The device as claimed in claim 21 wherein said means for adjusting is operable by a remote user.

23. The device as claimed in claim 21 wherein said means for adjusting is operable by remote user manipulation of the fishing line user end.

* * * * *